Feb. 20, 1940.  D. J. CAVANAUGH  2,191,368
AUTOMOBILE BUMPER
Filed March 19, 1938
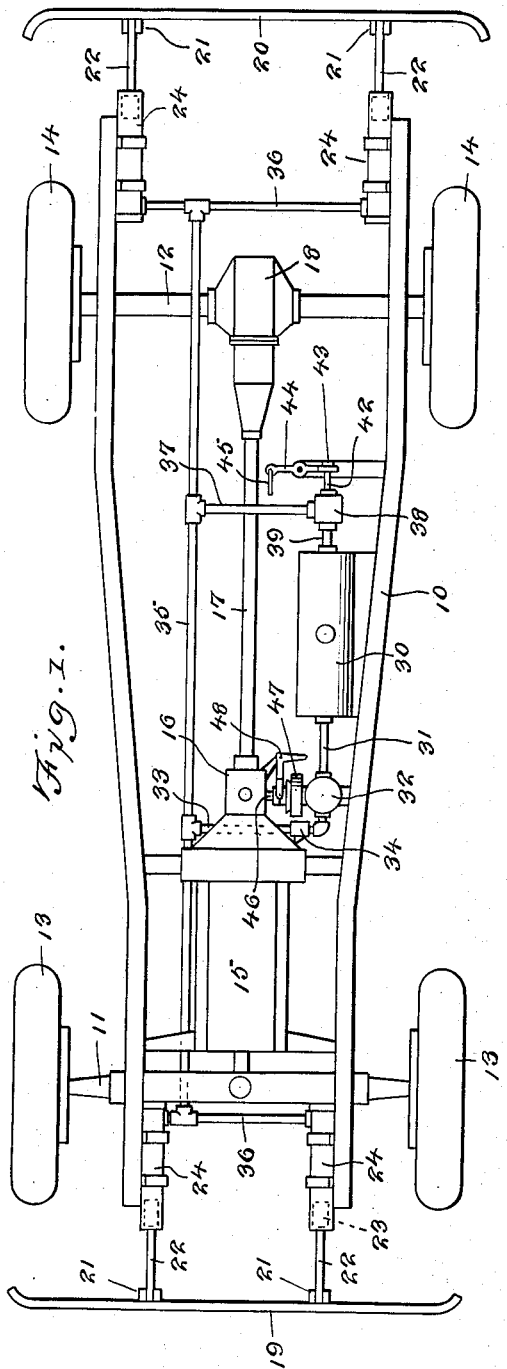
D. J. Cavanaugh
INVENTOR
BY Victor J. Evans & Co.
ATTORNEYS Patented Feb. 20, 1940

2,191,368

UNITED STATES PATENT OFFICE 2,191,368

AUTOMOBILE BUMPER

Daniel J. Cavanaugh, Holyoke, Mass.

Application March 19, 1938, Serial No. 197,019

3 Claims. (Cl. 293—55)

This invention relates to automobile bumpers and more particularly to an extensible device of this character which is maintained normally in retracted position but which may be extended at the will of an authorized operator of the vehicle.

The prime object of the invention is to provide for the maintenance of ample space for ready removal of a parked automobile.

Another object is to provide a practical and efficient hydraulic operating and controlling mechanism for extending and holding the front and rear bumpers.

A further object is to provide against unauthorized retraction of the bumpers.

With these and other objects to be attained, as will later more fully appear, the invention consists in the general structure and in the parts and combinations and arrangements of parts thereof, as hereinafter described and pointed out with particularity in the appended claims, reference being had to the accompanying drawing forming a part of this specification and illustrating a practical adaptation of the invention, and in which Figure 1 is a plan view of an automobile chassis showing the mounted arrangement of the front and rear bumpers and the hydraulic operating and controlling means thereof;

Figure 2 is a longitudinal section through one of the hydraulic bumper cylinders with the bumper in normal retracted position;

Figure 3 is a fragmentary view, on an enlarged scale, illustrating the controlling clutch arrangement for operating the pump element of the apparatus; and Figure 4 is a view of the release valve.

Referring now to the drawing, the numeral 10 designates generally the chassis or supporting under frame of the vehicle which is shown conventionally and mounted on the front and rear axles 11 and 12, respectively, having the front and rear wheels 13 and 14. At the forward portion of the frame 10 is the usual motor unit 15 at the rear of which is the transmission mechanism housed in the casing as conventionally shown at 16, and from which latter extends the propeller shaft 17 which drives the rear axle by means of the interposed differential gearing conventionally indicated at 18.

Front and rear bumpers 19 and 20 are provided, and as the construction and mounting of each of said bumpers is the same, a detailed description of one will suffice. As shown, the bumper is mounted, as at 21, on the outer ends of supporting bars 22 having pistons 23 at their inner ends which are slidably mounted in cylinders 24, said cylinders being securely fastened to the front and rear end portions of the side members of the chassis or under frame 10 of the vehicle.

Normally, the bumpers 19 and 20 are yieldably held in retracted position by means of suitable spring elements 25, said element 25, as shown more or less conventionally in Figure 2, being attached at one end to the piston 23, as at 26, and at its opposite end, as at 27, to a cap member or head 28 provided on the inner end of the cylinder 24. The piston 23, as shown, is provided with the usual cupped packing 29.

The bumpers 19 and 20 are moved to an extended position by fluid pressure supplied to the cylinders 24 whereby to move the respective pistons 23 outwardly against the tension of the spring elements 25 by means of the fluid pressure as will now be described.

Located conveniently on the chassis 10 is a reservoir 30 containing oil or other suitable noncompressible liquid, said reservoir being connected by the pipe 31 to the pump 32. Leading from the outlet of the pump is a pipe 33 having a check valve 34 therein, said pipe 33 being connected to a longitudinal distributor pipe 35, which latter is connected at its opposite ends to transverse header pipes 36, said pipes 36 crossconnecting the pair of bumper cylinders 24 at each end of the chassis or under frame 10.

A pipe 37 connects the distributor pipe 35 with a casing 38 which latter is in turn connected to the reservoir 30 by a pipe 39, and having a check valve 40 provided in said casing 38 which is normally urged in closing relation to the pipe 39 by a spring element 41.

By the foregoing arrangement, liquid may be drawn from the reservoir 30 through the pipe 31 by the pump 32, and by the provision of the check valves 34 and 40 in their particular positions in the pipe system, the liquid is forced under pressure from the pump 32 through the pipe 33, distributor pipe 35, and header pipes 36 simultaneously into each of the cylinders 24 between the cap member or head 28 and the piston 23, whereupon hydraulic pressure is set up in the respective cylinders sufficiently to move the pistons against the combined tension of the springs 25, and the liquid pressure being maintained in the system by the check valve 40, which latter is released manually by the operator when it is desired to retract the bumpers.

Any suitable operating and controlling means may be provided for the release of said check valve 40, but, as conventionally shown in Figure 4, the valve 40 is provided with a stem 42 which is projected outwardly through the casing 38 and provided with a head 43 on its outer end so as to be engaged by a lever member 44, to which latter a link member 45 is attached. In this connection, it is noted that the link member 45 is extended from the lever 44 to a convenient operating position within reach of the operator.

Any suitable motive power may be provided for the pump 32, but as shown, a shaft connection 46 is extended from the transmission mechanism 16, as conventionally illustrated in Figures 1 and 3, with a suitable clutch device 47 and operating lever 48, by which arrangement the pump 32 is operated from the motor unit 15 after the automobile has been parked in the usual way and before the motor has been stopped. Obviously, however, an electrical or other supplemental motor may be provided for said pump 32.

With an automobile equipped in accordance with the present invention and the bumpers 19 and 20 in normally retracted position, it is obvious that the automobile may be parked in the usual way and the bumpers then extended until such time that it is desired to move the automobile, the extended bumpers, in the meantime, preventing the crowding of an adjacent automobile into the limited reserve space at the front or rear of the parked automobile. It is thus noted that ample space is always reserved and to remove the automobile from the space so maintained it is only necessary to first release the valve 40 so that the liquid in the cylinders 24 can be returned to the reservoir 30 when the springs 25 retract the respective pistons 23 and the bumpers carried thereby. At the same time, unauthorized extension and retraction of the bumpers may be practically prevented by locking the controlling means of the pump 32 and said valve 40, either directly or by locking the doors of the vehicle body as is usually done when the vehicle is parked. It is further noted that by keeping the check valve 40 normally locked in open position unauthorized extension of the bumpers is prevented even though the pump 32 is unlocked and operated, because the liquid will be pumped back into the reservoir through the relief pipe 37, and, therefore, no pressure is built up in the cylinders 24 sufficient to move the pistons 23 forwardly.

Obviously, the construction and arrangements of the apparatus may be modified in many respects without departing from the spirit of the invention as defined by the appended claims. The invention, therefore, is not limited to the specific construction and arrangements shown.

What is claimed is:

1. The herein described parking-line-space-holding means for automobiles and the like, comprising an otherwise conventional transverse bumper element proper mounted adjacent its opposite ends with provision for extension and retraction relative to the adjacent end of the vehicle, means for yieldably holding said bumper element proper in a normally retracted but conventionally operative position and reacting to automatically retract said element to such normal position after extending operation thereof, and fluid pressure means for actuating said bumper element proper to an extended parking-space-holding position and for releasably holding it in such position, said means including a power cylinder carried by the vehicle, a piston working with longitudinal reciprocation in said cylinder and having a positive operable connection with said bumper element proper whereby the one is actuated by and with the other, a source of fluid supply on the vehicle, a pipe connection from said source of fluid supply to said cylinder at a point between an opposed head of the cylinder and said piston therein, said pipe connection including a pump element within the length thereof and a check valve element between the pump element and cylinder, said valve element opening only toward the cylinder and holding fluid pressure created in the cylinder by the operation of the pump element, a return pipe connection from the cylinder to the source of fluid supply, said return pipe connection having a check valve element therein normally closed to prevent flow in the direction of the source of fluid supply, and controllable means for opening said check valve element in the return pipe connection.

2. The herein described parking-line-space-holding means for automobiles and the like, comprising front and rear bumpers each including an otherwise conventional transverse bumper element proper mounted adjacent its opposite ends with provision for extension and retraction relative to the adjacent end of the vehicle, means for yieldably holding each of said bumper elements proper in a normally retracted but conventionally operative position and reacting to automatically retract said elements to such normal position after extending operation thereof, and fluid pressure means for actuating the respective bumper elements proper to an extended parking-space-holding position and for releasably holding them in such position, said means comprising power cylinders carried by the vehicle, the respective cylinders for each bumper element proper comprising a cooperative pair thereof disposed longitudinally on the vehicle in laterally opposed parallel relation to each other, each cylinder having a piston working with longitudinal reciprocation therein and having a direct rod connection with the bumper element proper whereby the one is actuated positively by and with the other, a source of fluid supply on the vehicle, transverse header pipes respectively connecting the power cylinders of each cooperative pair thereof, the communicable attachment of said header pipes to the respective cylinders being between the inner head of the cylinder and the piston therein, a common distributor pipe connecting said header pipes, a pipe connection from said source of fluid supply to said distributor pipe, said pipe connection including a pump element within the length thereof and a check valve element between the pump element and said distributor pipe, said valve element opening only toward said distributor pipe, a return pipe connection from said distributor pipe to the source of fluid supply, said return pipe connection having a check valve element therein normally closed to prevent flow in the direction of the source of fluid supply, and controllable means for opening said check valve element in the return pipe connection.

3. The herein described parking-line-space-holding means for automobiles and the like, comprising an otherwise conventional transverse bumper element proper mounted adjacent its opposite ends with provision for extension and retraction relative to the adjacent end of the vehicle, means for yieldably holding said bumper element proper in a normally retracted but conventionally operative position and reacting to automatically retract said element to such normal position after extending operation thereof, and controllable means for actuating said bumper element proper to an extended parking-space-holding position and for releasably holding it in such position, said means including a fluid-pressure-actuated prime mover having a positive operable connection with said bumper element proper whereby the one is movable by and with the other, means for applying fluid under pressure to said prime mover to actuate it in the direction to move the bumper element proper to its extended parking-space-holding position against the reactive effect of the normal holding and retracting means of said bumper element proper, and means for relieving said prime mover from the influence of the fluid pressure, the means for applying the fluid pressure to said prime mover and the means for relieving the prime mover of such pressure being under the control and operated at the will of the operator.

DANIEL J. CAVANAUGH.